UNITED STATES PATENT OFFICE.

ASA R. REYNOLDS, OF NEW YORK, N. Y.

IMPROVEMENT IN TREATING FIRE-BRICK AND SIMILAR MATERIALS USED FOR METALLURGIC PURPOSES.

Specification forming part of Letters Patent No. 210,963, dated December 17, 1878; application filed October 4, 1878.

*To all whom it may concern:*

Be it known that I, ASA R. REYNOLDS, of the city, county, and State of New York, have discovered certain new and useful improvements in the art of treating articles made from refractory materials, and in the articles produced thereby; and do hereby declare the following to be a full, clear, and exact description of the same.

Prior to my discovery, crucibles used for treating metals or metal articles, pots used for decarburizing articles of cast-iron, and carburizing articles of wrought-iron, fire-brick, tiles, or slabs used for forming the walls of furnaces, retorts for making gas, and other articles that in use were subjected to great heat, were rapidly destroyed, and had to be constantly replaced by new ones at great expense and labor.

I have discovered a mode of treating such articles made from refractory materials, and the articles resulting from such treatment—such as pots, crucibles, fire-brick, tiles, or slabs, retorts for making gas, and other articles which, when in use, are subjected to great heat—so that said articles will not be destroyed by the heat to which they are subjected when used for the practical purposes for which they are designed; and I shall now proceed to describe my discovery in such full, clear, and exact terms as its nature permits, and as will enable those skilled in the art to which it appertains to use the same.

I make crucibles for treating metals and metal articles, the pots for decarburizing articles of cast-iron and carburizing articles of wrought-iron, the bricks, tiles, or slabs, the retorts for making gas, and other articles that in use are subjected to high degrees of heat, in any desired form, from the materials of which fire-brick is usually made, or their equivalents, such as any artificial preparation of sand, clay, or other materials capable of being used in place of fire-brick, and capable of absorbing carbon, bake them in any well-known manner, and then impregnate or saturate them with carbon, to render them almost indestructible to heat, when such articles are used for the practical purpose for which they are designed.

The best mode which I have found in practice for impregnating said articles with carbon is as follows: I take the crucibles for treating metals and metal articles and the pots for decarburizing articles of cast-iron, or carburizing articles of wrought-iron, made from the materials above described, and properly baked, and fill the same with animal or wood charcoal, or any other carbonaceous material, then bring the same to about a bright cherry-red heat, at which heat the said crucibles or pots made of such materials absorb carbon, some of the said carbonaceous material being placed about the outside of said crucibles or pots with the fuel, and then subject them to said heat for about five hours in any furnace or other heating apparatus capable of giving and withstanding this heat.

The pots or crucibles are then allowed to cool, then taken from the furnace or other heating apparatus, the residuum of the carbonaceous material removed, when they are ready for use, for treating metals or metal articles, and decarburizing articles of cast-iron, or carburizing articles of wrought-iron.

After the crucibles have been used in treating metals and metal articles, and while they are still hot at or about a bright cherry-red heat, I fill them again with carbonaceous material, by which they are again impregnated with carbon from the inside, then let them cool, and then remove the residuum of the carbonaceous material. When they are to be again used to treat metals and metal articles, and while the metal is in them and they are in their furnace, some of the said carbonaceous material is placed about the outside of the same with the fuel, by which they are again impregnated with carbon from the outside, when they are brought to about a bright cherry-red heat. The crucibles are preferably treated in this manner after every heat, their life being thus renewed, and they rendered almost indestructible by heat.

Each time the pots impregnated with carbon for decarburizing articles of cast-iron and carburizing articles of wrought-iron are used they are again impregnated from the inside by the carbon from the articles of cast-iron in decarburizing articles of cast-iron, or by the carbon from carbonaceous material used in carburizing articles of wrought-iron, and from the outside by placing some carbonaceous material about their outside with the fuel, the said pots in use for decarburizing or carburizing being brought to a heat about or above a bright cherry-red, the life of the pots being thus renewed every time a heat is taken by them.

In treating other articles made from the materials above described and properly baked—such as bricks, tiles, or slabs to be used in forming the walls of furnaces, and for other purposes, retorts for gas-making, or any article the surface and body of which is subjected to intense heat—I impregnate the same with carbon by subjecting said articles for about five hours to a bright cherry-red heat in a furnace or other heating apparatus capable of giving and withstanding this heat. After these articles have been so treated and are in their proper places for use, I again impregnate those surfaces that are in contact with the flame, at intervals of time, (daily I find preferable,) with carbon, by placing carbonaceous material in contact with them, or in the fuel used for heating them, and subjecting them to about the heat and for about the length of time above described when first treating them.

The walls of furnaces made from the materials of which fire-brick is composed, or their equivalents, properly baked, may be impregnated with carbon after they are formed by placing carbonaceous material in contact therewith, or in the fuel for heating them, then subjecting them to about the heat and for about the length of time before described with reference to the treatment of the bricks, tiles, slabs, and retorts, and then impregnating them with carbon at intervals of time, preferably daily, in the manner before described with reference to the said tiles, bricks, slabs, and retorts, when in use, to renew their life.

It is obvious that my discovery may be used in treating and producing articles other than those heretofore specifically named made from the materials of which fire-brick is composed, or their equivalents, properly baked.

Any abrasion of the crucibles, pots, bricks, tiles, slabs, retorts, or other articles made from the materials and impregnated with carbon, as above described, can be replaced by a thin coating of the same material of which the pots are composed.

By my discovery the surfaces and bodies of various articles made from the materials of which fire-brick is composed, or their equivalents, of any desired form, and properly baked, are rendered nearly indestructible from heat by impregnating them with carbon at intervals of time, thus renewing their life, as I have described.

I do not confine myself to the exact length of time or to the exact degree of heat above given for impregnating such articles, or to the intervals of time for again impregnating them with carbon, as they may be varied within wide limits by a skilled workman, and yet be within the scope of my discovery.

I have found the mode of treatment I have described to be a desirable one in practice, and therefore have given it as the best mode known to me for carrying out or using my discovery.

Having thus described my discovery, what I claim as new, and desire to secure by Letters Patent, is—

1. The mode of treating articles made from materials of which fire-brick is composed, or their equivalents, by impregnating them with carbon, as and for the purpose described.

2. Articles made from the materials of which fire-brick is composed, or their equivalents, impregnated with carbon, as and for the purpose described.

In testimony whereof I have signed my name to this specification in the presence of two subscribing witnesses.

ASA R. REYNOLDS.

Witnesses:
M. B. PHILIPP,
CHARLES E. FOSTER.